Aug. 23, 1927.
A. J. BECKER
1,640,308
AUTOMATIC STEVEDORE TRUCK BRAKE
Filed Jan. 26, 1927  2 Sheets-Sheet 1
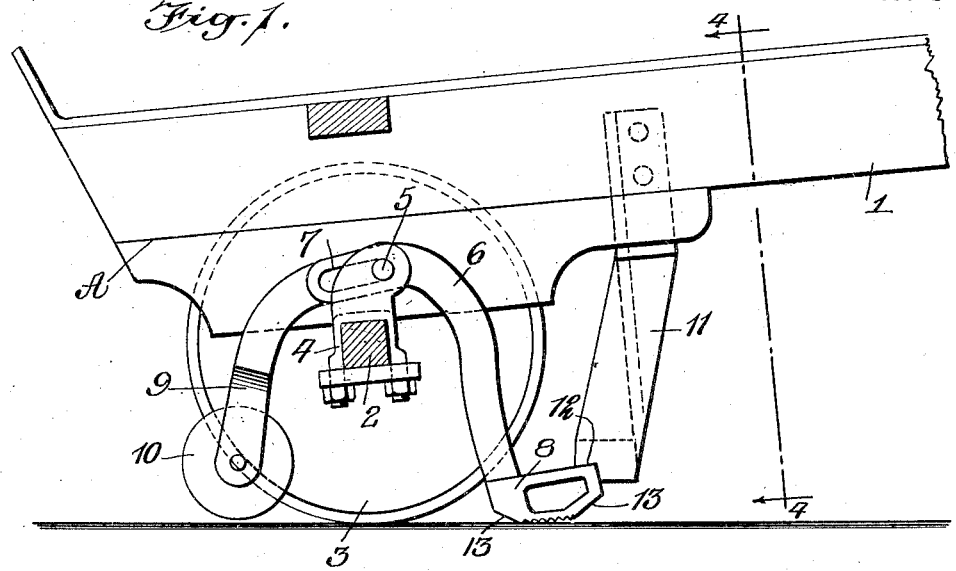
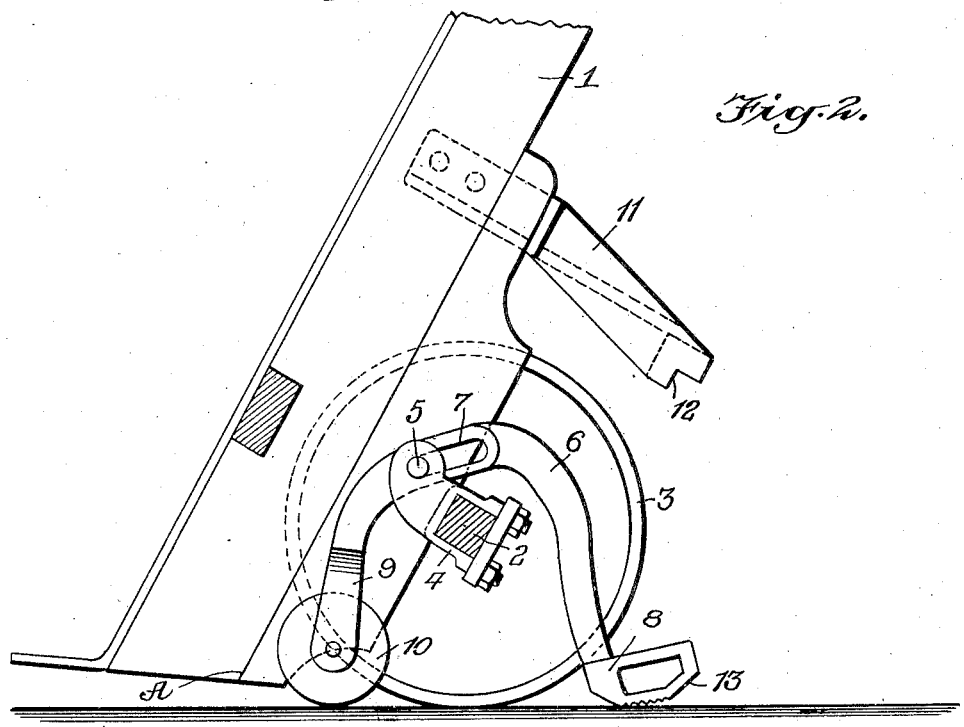
WITNESSES
INVENTOR
Allen J. Becker
BY
ATTORNEY Aug. 23, 1927.  
A. J. BECKER  
1,640,308  
AUTOMATIC STEVEDORE TRUCK BRAKE  
Filed Jan. 26, 1927  
2 Sheets-Sheet 2
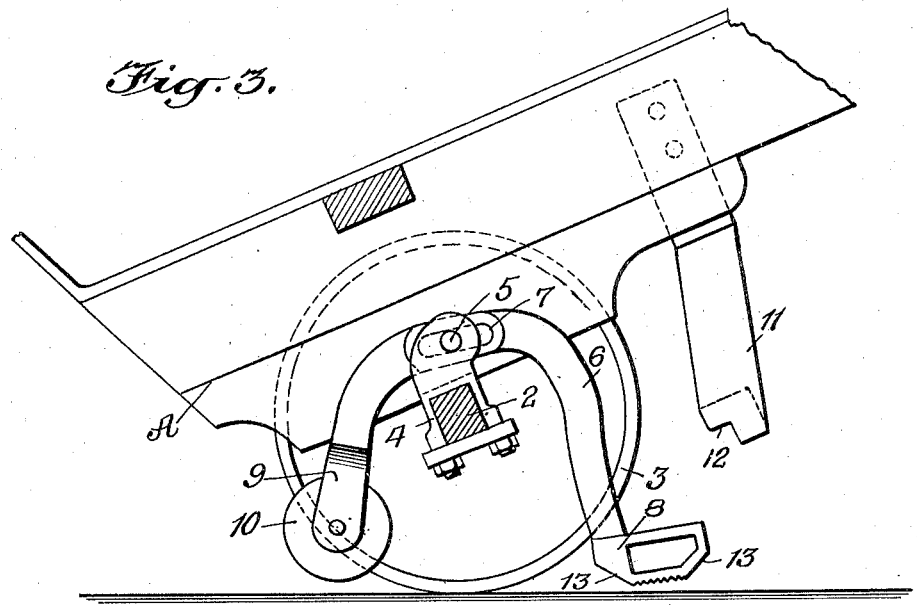
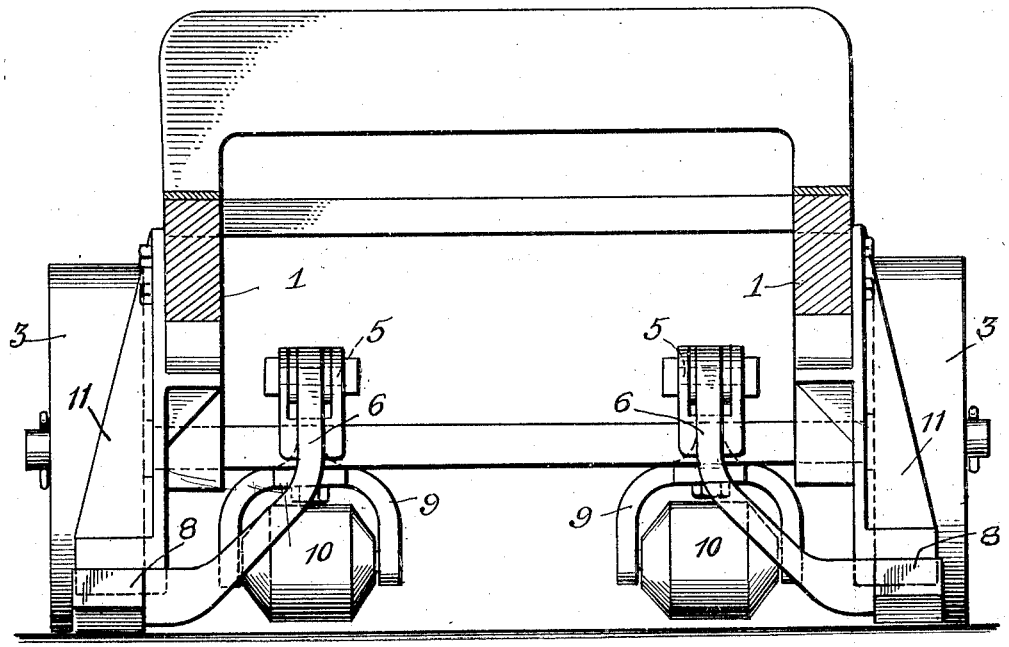
WITNESSES
INVENTOR  
Allen J. Becker  
BY  
ATTORNEY Patented Aug. 23, 1927.

1,640,308

UNITED STATES PATENT OFFICE.

ALLEN J. BECKER, OF UPPER MONTCLAIR, NEW JERSEY.

AUTOMATIC STEVEDORE-TRUCK BRAKE.

Application filed January 26, 1927. Serial No. 163,742.

This invention relates to automatic stevedore truck brakes.

An object of the invention is to provide a brake which may be attached to the ordinary stevedore truck and which will be automatic in operation and controlled by the pitch or angular disposition of the truck or handles of the truck so as to function when the brake is moved in either direction.

A further object is to provide a truck brake of this character which can be controlled by the movement of the handles of the truck so as to ease the load on an incline, permitting the truck to travel at the speed desired and functioning to automatically stop the truck in the event that the workman trips or falls so as to prevent the possibility of running over or injuring him.

A further object is to provide a brake of this character which prevents the truck from tilting over or kicking backward and which securely holds the truck in loading or unloading position so that the truck cannot accidentally move in either direction.

A further object is to provide a brake of this character which results in lowering the insurance rate of the laborer, and which saves labor because one man may operate the truck in places where several men have been heretofore required.

A further object is to provide a brake of this character which may be easily and quickly attached to the standard type of truck, which will be comparatively cheap to manufacture, and which will most efficiently perform the functions for which it is intended.

With these and other objects in view, the invention consists in certain novel features of construction and combinations and arrangements of parts, which will be more fully hereinafter described and pointed out in the claims.

In the accompanying drawings—

Figure 1 is a fragmentary view in longitudinal section showing my improved brake on a stevedore truck, the brake being shown as applied and held in braking position by the weight of the forward portion of the truck;

Figure 2 is a similar view showing the truck in loading position;

Figure 3 is a similar view showing the truck in position for travel;

Figure 4 is a view in transverse section on the line 4—4 of Figure 1.

A represents a truck which we will assume is the ordinary stevedore truck having forwardly projecting handles 1 and supported on an axle 2 which is mounted in wheels 3.

On the axle 2 I secure a pair of shackles 4 and these shackles 4 have their upper bifurcated portions forwardly projected and supporting a transverse pivot pin, bolt or other analogous device 5. While this pin 5 preferably constitutes a bolt I shall hereinafter refer to it as a pin, with the understanding that this language is employed to include any device which may be used for the purpose.

I preferably utilize a pair of brake devices for each wheel, and as these brake devices are precisely alike except that they are rights and lefts, the description hereinafter as to one brake device and its operation will apply alike to both.

Each brake device comprises a brake bar 6 which is shaped somewhat after the manner of an inverted fork, the intermediate portion of the bar having a slot 7 therein through which the pin 5 projects.

The forward leg of the brake bar carries a brake shoe 8, and the rear bifurcated end 9 of the brake bar carries a relatively heavy roller 10, it being understood that this roller supporting the rear end of the bar is heavier than the forward end of the bar.

The brake shoe 8 constitutes both a ground or floor engaging device and a wheel engaging device so that it is in effect a chuck, and the forward portions of the brake bars are laterally offset so as to dispose these shoes 8 in front of the wheels 3.

On the truck A in advance of the axle 2 I secure a pair of depending legs 11, the lower ends of these legs being notched, as shown at 12, so as to engage the forward corners of the brake shoes 8, and when the load is on the truck and the brake is in the position shown in Figure 1 these legs 11 will bear downwardly and rearwardly on the shoes 8 and crush the shoes against the ground and against the peripheries of the wheels 3, causing them to prevent any movement of the truck in either direction.

It will be noted that the shoes 8 at their forward and rearward portions have their under faces beveled, as indicated at 13, to allow the shoes to ride over an uneven place or obstruction on the floor or ground.

I would call particular attention to the disposition of the slot 7. It will be seen, particularly by reference to Figure 1, that this slot 7 has its longitudinal walls disposed at an angle to the ground and also at an angle to the diameter of the wheel, so that as the walls of the slot ride upon the pins 5 there will be a certain amount of cam action which causes the brake bars to lift or move downwardly in accordance with the direction of movement, and by reason of the fact that the pins 5 are forwardly offset the shoes 13 and the rollers 10 are caused to move automatically in the direction and into the positions which will now be described and which are clearly illustrated in the several figures in the drawings.

As above stated, Figure 1 illustrates the brake shoes 8 in holding position utilizing the weight of the truck and the load thereon to force the shoes against the floor or ground and into contact with the wheels so that the shoes constitute chucks. When the forward ends of the handles 1 are elevated to the position shown in Figure 3 the axle 2 will be turned causing the pin 5 to ride in the slot 7 to the position shown in Figure 3 and elevate both shoes 8 and the rollers 10 so that the truck may be conveniently moved from place to place and carry the load wherever desired.

As the roller ends 10 are the heavier ends they will prevent any downward movement of the shoes 8. It is of course possible that these rollers may engage the ground from time to time but this will do no damage as the truck when being moved over the level ground is pushed rather than pulled and the operator only pulls the truck when moving down an incline.

If the laborer should fall while ascending or descending an incline the weight of the load will automatically move to the position shown in Figure 1 and stop the truck so as to prevent injuring the workman.

In order to control the speed of the truck on an incline it is simply necessary for the workman to raise and lower the forward ends of the handles 1 and apply the brakes as much as may be desired. When the truck is moved to loading position, as indicated at Figure 2, both the rollers 10 and the shoes 8 are on the ground or floor with the pivot pin 5 in the rear end of slot 7, so that the truck is held against accidental movement in either direction. If the load is deposited suddenly on the lower end of the truck, which with an ordinary brake would tend to kick the truck backwardly, this action is absolutely prevented by my improved brake, as will be readily understood.

It will therefore be noted that the brake bar with its brake shoes and rollers automatically takes the several positions illustrated, in accordance with the incline of the truck or the handles, therefore, accidents are prevented, the cost of insurance reduced, and there is a marked saving in labor because one man can easily handle a truck with any load thereon without danger of accident.

Various changes and alterations might be made in the general form of the parts described without departing from the invention and hence I do not limit myself to the precise details set forth but consider myself at liberty to make such changes and alterations as fairly fall within the spirit and scope of the appended claims.

I claim:

1. A brake of the character described, comprising a brake bar adapted to be pivotally and movably mounted on the axle of a truck, a brake shoe at the forward end of the brake bar and a ground-engaging member at the rear end of the brake bar.

2. A brake of the character described, comprising a brake bar adapted to be pivotally and movably mounted on the axle of a truck, a brake shoe at the forward end of the brake bar, a ground-engaging roller at the rear end of the bar and a leg depending from the truck and adapted to engage said shoe.

3. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars.

4. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars, said pivot pins forwardly offset relative to the axle.

5. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars, said pivot pins forwardly offset relative to the axle, and said slots having their longitudinal walls angularly disposed relative to the ground and the diameter of the wheels.

6. In combination with a stevedore truck, of a pair of shackles secured to the axle of the truck, pins supported by said shackles, brake bars having slots intermediate their ends receiving the pins, brake shoes at the forward ends of the bars, rollers at the rear ends of the bars, and legs fixed to the truck and adapted to engage the shoes when the forward portion of the truck is in its lowest position.

7. In combination with a stevedore truck, of a pair of shackles secured to the axle of the truck, pins supported by said shackles, brake bars having slots intermediate their ends receiving the pins, brake shoes at the forward ends of the bars, rollers at the rear ends of the bars, said pivot pins forwardly offset relative to the axle, and legs fixed to the truck and adapted to engage the shoes when the forward portion of the truck is in its lowest position.

8. In combination with a stevedore truck, of a pair of shackles secured to the axle of the truck, pins supported by said shackles, brake bars having slots intermediate their ends receiving the pins, brake shoes at the forward ends of the bars, rollers at the rear ends of the bars, said pivot pins forwardly offset relative to the axle, and said slots having their longitudinal walls angularly disposed relative to the ground and the diameter of the wheels, and legs fixed to the truck and adapted to engage the shoes when the forward portion of the truck is in its lowest position.

9. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars, said bars at their forward portions laterally offset whereby the shoes are positioned in front of the wheels, said shoes constituting chucks and having beveled or inclined lower portions at both ends thereof.

10. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars, said pivot pins forwardly offset relative to the axle, said bars at their forward portions laterally offset whereby the shoes are positioned in front of the wheels, said shoes constituting chucks and having beveled or inclined lower portions at both ends thereof.

11. In combination with a stevedore truck, of a pair of shackles secured to the axle of the truck, pins supported by said shackles, brake bars having slots intermediate their ends receiving the pins, brake shoes at the forward ends of the bars, and rollers at the rear ends of the bars, said pivot pins forwardly offset relative to the axle, and said slots having their longitudinal walls angularly disposed relative to the ground and the diameter of the wheels, said bars at their forward portions laterally offset whereby the shoes are positioned in front of the wheels, said shoes constituting chucks and having beveled or inclined lower portions at both ends thereof.

ALLEN J. BECKER.